United States Patent [19]

Miura et al.

[11] Patent Number: 5,498,122

[45] Date of Patent: Mar. 12, 1996

[54] WORK SUPPLY METHOD AND APPARATUS THEREFOR

[75] Inventors: Toshihiko Miura; Ryohei Inaba, both of Kawasaki, Japan

[73] Assignee: Canon Kabushiki Kaisha, Tokyo, Japan

[21] Appl. No.: 267,304

[22] Filed: Jun. 29, 1994

Related U.S. Application Data

[63] Continuation of Ser. No. 987,998, Dec. 9, 1992, abandoned, which is a continuation of Ser. No. 634,495, Dec. 27, 1990, abandoned.

[30] Foreign Application Priority Data

Dec. 29, 1989 [JP] Japan ..................................... 1-341985

[51] Int. Cl.$^6$ .................................................. B65G 60/00
[52] U.S. Cl. .................... 414/786; 414/788.7; 414/794.2; 414/924
[58] Field of Search ............................... 187/20; 414/786, 414/788.4, 788.7, 794.2, 795.8, 796.7, 924

[56] References Cited

U.S. PATENT DOCUMENTS

| | | | |
|---|---|---|---|
| 4,055,256 | 10/1977 | Hagedorn | 414/794.2 X |
| 4,055,257 | 10/1977 | Krebs | 414/924 X |
| 4,557,655 | 12/1985 | Berg | 414/788.7 |
| 4,588,341 | 5/1986 | Motoda | 414/788.4 |
| 4,687,403 | 8/1987 | Motoda | 414/788.7 X |
| 4,720,228 | 1/1988 | Horiguchi et al. | 414/788.4 |
| 5,024,593 | 6/1991 | Hehl | 414/788.7 X |

FOREIGN PATENT DOCUMENTS

| | | | |
|---|---|---|---|
| 1-115526 | 5/1989 | Japan | 414/788.7 |
| 2-215619 | 8/1990 | Japan | 414/788.4 |
| 2-243421 | 9/1990 | Japan | 414/788.4 |
| 1366356 | 1/1988 | U.S.S.R. | 414/788.4 |

*Primary Examiner*—David A. Bucci
*Assistant Examiner*—Janice L. Krizek
*Attorney, Agent, or Firm*—Fitzpatrick, Cella, Harper & Scinto

[57] ABSTRACT

This invention discloses a method for supplying a robot for assembling or working on works or component parts, with the works contained in pallets through a supply apparatus. The pallets in stacked state, containing the works, are delivered to an elevator in the supply apparatus, then moved to a work supply position by the elevator, and maintained in this position for effecting the pick-up operation of the works by the robot. When a pallet is emptied, the empty pallet is moved from the work supply position to a discharge position, and the empty pallets are circulated to an empty pallet discharge position.

1 Claim, 5 Drawing Sheets

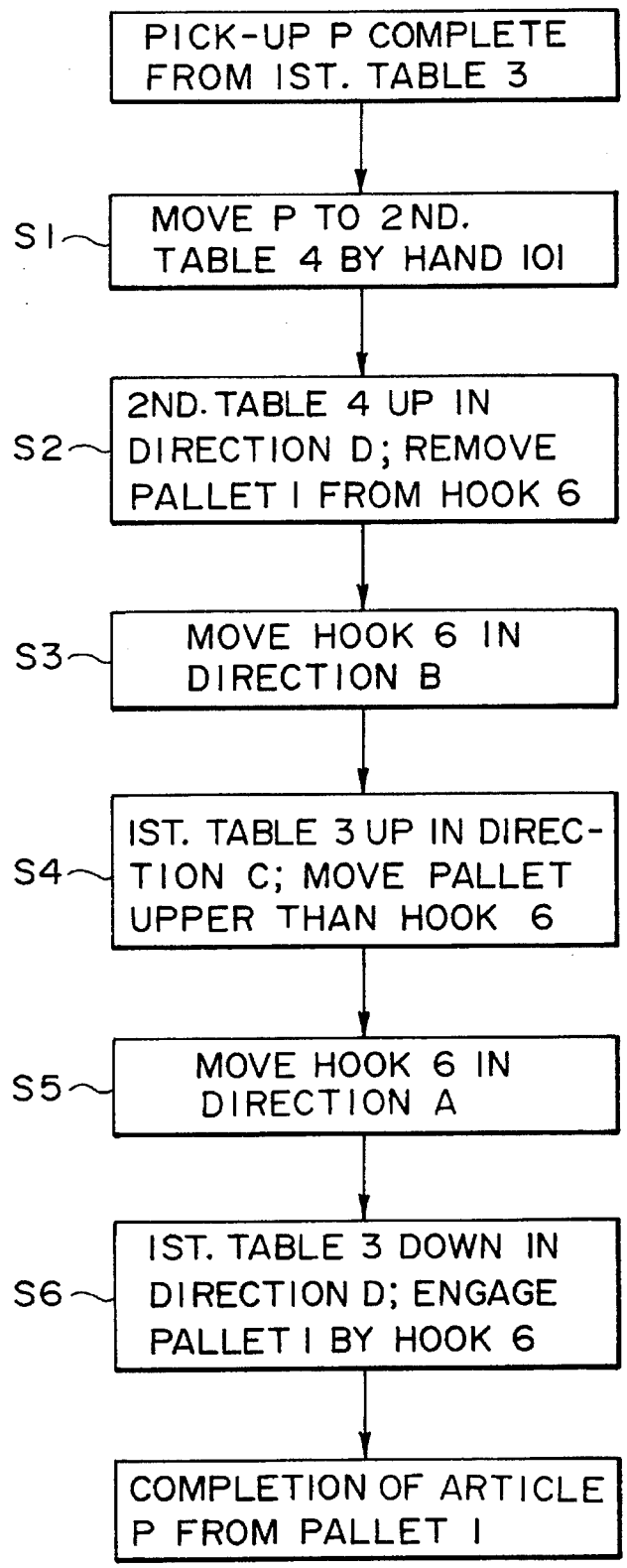
F I G. 4

WORK SUPPLY METHOD AND APPARATUS THEREFOR

This application is a continuation, of application Ser. No. 07/987,998 filed Dec. 9, 1992, now abandoned, which is a continuation of application Ser. No. 07/634,495, filed Dec. 27, 1990, abandoned.

BACKGROUND OF THE INVENTION

1. Field of the Invention

The present invention relates to a method for supplying works contained in a pallet and an apparatus therefor, adapted for use in various working machines such as an automatic working machine or an automatic assembling machine.

2. Related Background Art

A pallet supply apparatus, for supplying pallets to various machines such as an automatic working or assembling machine, is in general precisely positioned with respect to such working machine, and is usually constructed as a fixed unit in order to ensure the assembling precision by an assembling robot.

Also in the working or assembling lines in the manufacturing factory, the locations of the working or assembling machines may be varied depending on the size of such machines or according to various limitations in the facility. In such case, the articles to be worked, or works, are contained in pallets and such pallets are transported by an automatic cart or manually on a pallet supply apparatus.

FIG. 5 is a lateral view of a conventional pallet supply apparatus, wherein unrepresented elevator means in a supply apparatus 122 can move between an upper position and a lower position, thereby supporting and transporting pallets 1.

Above an equipment 170 such as a working or assembling machine, there is provided a robot unit 150 having a robot hand 150h which moves the works from the pallet 1 to an assembling jig pallet 180 as indicated by arrows. Between the supply apparatus 122 and the equipment 170 there are provided a pallet-introducing conveyor 120 with a stopper 124 and a pallet-discharging conveyor 119 with a stopper 123, both of which are partly supported by a conveyor support 121. There is further provided an elevator 125 for vertically moving the pallets 1.

The pallet supply operation in the above-explained conventional structure is conducted in the following manner. The supply apparatus 122, composed for example of an automatic cart, is moved perpendicularly to the plane of drawing to a predetermined position, and a lower pallet 1 therein is moved to the position of the stopper 124 of the pallet-introducing conveyor 120. Then the pallet 1 is moved, by the release of the stopper 124, to the position of the elevator 125, and is subsequently elevated to the illustrated position, at which the works in the pallet are moved to the jig pallet 180 by the robot hand 150h as indicated by arrows. When the pallet is emptied, the elevator 125 descends to the height of the conveyor 119 and the pallet 1 is moved until the right end thereof impinges on the stopper 123. Subsequently the stopper 123 is released to move the pallet 1 to the upper position of the supply apparatus 122.

Consequently the stacked pallets 1 are positioned in succession in the working range of the robot hand 150h.

Also the present applicant already proposed a pallet supply apparatus, as a U.S. patent application Ser. No. 493,437 filed Mar. 14, 1990, abandoned and refiled on Feb. 6, 1992 as Ser. No. 07/830,488, now U.S. Pat No. 5,190,434, which dispenses with the fixed mechanism associated with the pallet supply apparatus, thereby reducing the cost thereof and also dispensing with the pallet loading/unloading operation on the pallet supply apparatus at each pallet supply.

However, the conventional pallet supply apparatus as shown in FIG. 5, requiring associated fixed mechanisms as explained above, has been associated with the drawbacks that the apparatus is inevitably expensive, that pallet loading/unloading operation is indispensable on the pallet supply apparatus at each pallet supply, and that the robot hand may collide with the stacked pallets 1 positioned within the working range of said robot hand.

On the other hand, the pallet supply apparatus previously proposed by the present applicant has been associated with a low operation rate because the continuous operation of a certain equipment (robot unit) has to be interrupted, as the pallet supply apparatus has to be moved from the loading position to said equipment at the replacement of an emptied pallet with another pallet filled with the works.

SUMMARY OF THE INVENTION

In consideration of the foregoing, an object of the present invention is to provide a pallet supply apparatus allowing to reduce the cost and capable of avoiding the collision with pallets, dispensing with the pallet loading operation to the pallet supply apparatus at each pallet supply, and improving the working rate without interruption in the continuous operation of other equipment.

Another object of the present invention is to provide a pallet supply apparatus enabling easy loading of the filled pallet onto a first support table.

Still another object of the present invention is to provide a work supply method for supplying a robot with works contained in a pallet, in which the position for introducing stacked pallets into the supply apparatus is made the same as the position for discharging the empty pallet from the supply apparatus in order to ensure continuity in the work pickup operation of the robot. More specifically, the stacked pallets are transferred in succession to the work supply apparatus, and, in the course of the work pickup operation by the robot in the work supply apparatus on the last of said stacked pallets, the discharge of empty pallets and the introduction of new pallets are conducted.

Still another object of the present invention is to provide an apparatus with a simplification of the structure achieved by employing the same engaging means from a holding state of the pallet with works in a work supply position to the movement of said pallet, when it is emptied, to a discharge position.

BRIEF DESCRIPTION OF THE DRAWINGS

FIG. 4 is a flow chart of the control sequence of said pallet supply apparatus.

DETAILED DESCRIPTION OF THE PREFERRED EMBODIMENTS

Figure 1:
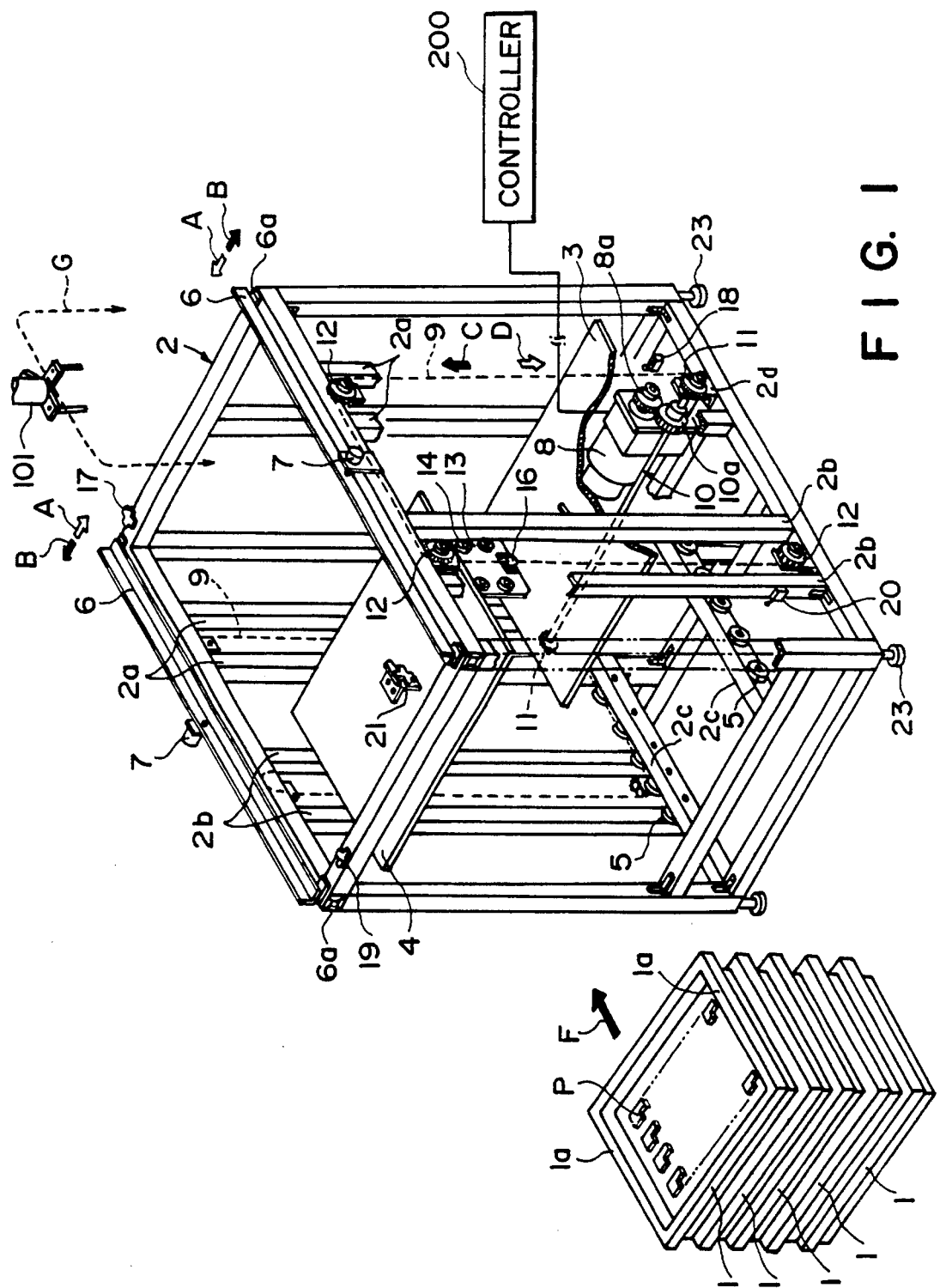
FIG. 1 is a partially cut-off perspective view of a pallet supply apparatus of the present invention, with stacked pallets and with a robot hand of a robot unit constituting the working equipment in the description.

Now the present invention will be clarified in detail by embodiments thereof shown in the attached drawings. FIG. 1 is a partially cut-off perspective view of a pallet supply apparatus of the present invention, with stacked pallets and with a robot hand of a robot unit constituting a working equipment.

Referring to FIG. 1, a robot hand 101 is provided on a robot unit 100 which is to be explained later and is rendered movable along unrepresented rails. By a predetermined operation of said robot unit 100, the robot hand 101 moves along a broken line G to grasp a work placed on the pallet and assemble said work on an unrepresented stage. In addition said robot hand 101 is adapted to engage an external edge portion of the pallet thereby moving said pallet.

Plural parts or works P are contained in predetermined positions in the pallet 1. As shown in FIG. 1, plural pallets 1 are stacked on an unrepresented floor and are placed, in said stacked state, on a first support table 3 to be explained later.

On lateral faces of a main body 2 constructed as a frame formed by welding or screwing angle members, there are provided guide members 2a for vertically guiding the first support table 3 and guide members 2b for vertically guiding a second support table 4. Said guide members also serve to reinforce said lateral faces.

In order to move the stacked pallets 1 in a direction along a black arrow F for placing on the first support table 3, said stacked pallets 1 have to be moved through a space below the second support table 4. For this purpose a conveyor unit 2c is horizontally provided in the main body 2 below the second support table 4, and freely rotatable plural conveyor rollers 5 are provided on both sides of the conveyor unit 2c. Thus the stacked pallets 1 filled with works can be placed on the first support table 3 by placing said stacked pallets 1 on said conveyor rollers 5 and pushing them in the direction of the arrow F.

Engaging means for supplying the pallet 1 by engaging with a protruding portion 1a thereof is composed of a pair of engaging members 6 of L-shaped cross section, which are driven toward each other in directions A indicated by white arrows and away from each other in directions B indicated by black arrows on two sets of slide packs 6a symmetrically provided on the upper face of the main body 2, and actuators composed for example of air cylinders 7 for driving said engaging members 6 in said directions A or B. Said air cylinders 7 are connected to a control unit 200 of the robot unit 100 and suitably drive the L-shaped engaging members 6 in the direction A or B.

Elevator means has a motor 8 integral with a gear head and fixed on the bottom of the main body 2. Said motor 8 can be driven in forward or reverse direction, and has a large detent torque. Said motor 8 has a motor gear 8a on the output shaft for transmitting the driving power, and is connected to and controlled by the aforementioned control unit 200. Said motor gear 8a meshes with a driving gear 10a on a driving shaft 10 which is rotatably supported by a pair of brackets 2d positioned between the guide members 2a at the bottom of the main body 2, thereby transmitting the driving power of the motor 8 to drive sprockets 11 (one being shown in broken lines) fixed on both ends of the drive shaft 10. At the upper end of the lateral faces of the main body 2 and above said drive sprockets 11, there are provided a pair of similar brackets 2d which rotatably support, respectively, idler sprockets 12.

Also at the upper and lower ends of the main body 2 and between the guide members 2b, there are provided paired brackets 2d (four in total) which rotatably support, respectively, idler sprockets 12. Each of endless drive chains 9 meshes with three idler sprockets 12 and a drive sprocket 11 as shown in FIG. 1 and is given an appropriate tension, and is moved in a direction C indicated by a black arrow or a direction D indicated by a white arrow, by the rotation of the drive sprocket 11.

Mounting brackets 13 are fixed on both ends of the bottom of the first support table 3 for supporting the pallets 1 containing the works and of the second support table 4 for supporting the empty pallets, and four guide rollers 14 rotatably mounted on each mounting bracket 13 are maintained in contact with mutually opposed faces of the guide members 2a and 2b and are guided by said members, whereby each of the first and second support tables 3, 4 is guided in vertical direction, while being maintained in the horizontal position. The drive chain 9 is fixed to said mounting bracket 13 by means of a fixing bracket 16. Thus, when the drive chain 9 is moved in the direction C of the black arrow by the rotation of the motor 8, the first support table 3 ascends in the same direction C, while the second support table 4 descends. On the other hand, when the drive chain 9 is moved in the direction D indicated by the white arrow, the first support table 3 descends while the second support table 4 ascends.

An upper end sensor 17 and a lower end sensor 18 are provided on the main body 2, for respectively detecting the uppermost and lowermost positions of thus vertically driven first support table 3. Also an upper end sensor 19 and a lower end sensor 20 are provided on the main body 2, for respectively detecting the uppermost and lowermost positions of the vertically driven second support table 4.

In the vicinity of the upper face of the second support table 40 there is provided a pallet sensor 21 for detecting the presence or absence of the last one of pallets, and said sensor 21 provides the control unit 200 with a detection signal indicating the presence or absence of the pallet 1. The upper end sensor 17, lower end sensor 18, upper end sensor 19, lower end sensor 20 and pallet sensor 21 are all connected to the control unit 200.

In the four corners of the bottom face of the main body 2 there are provided adjuster legs 23 of variable height, for horizontal positioning of the apparatus.

Figure 2:
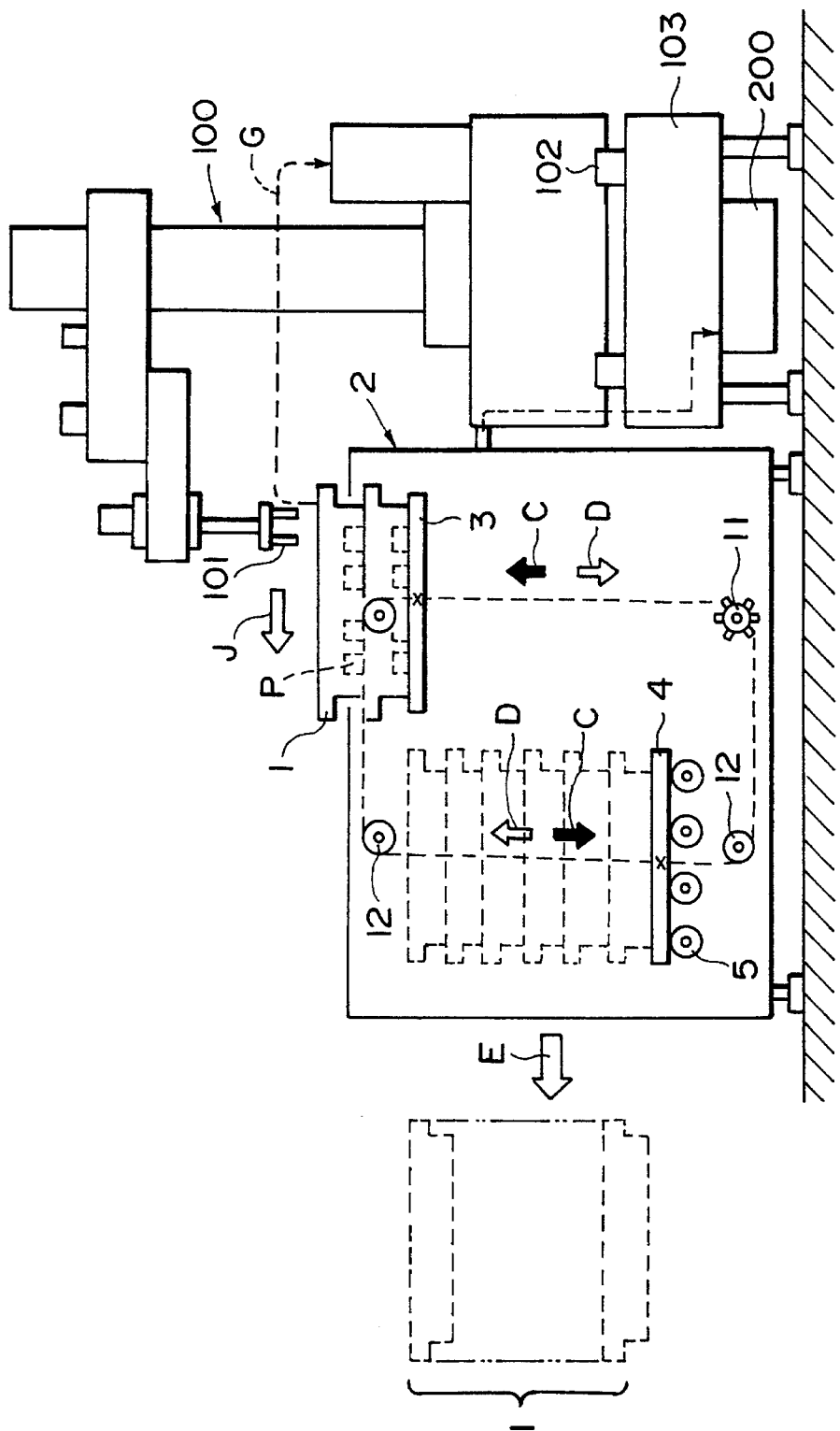
FIGS. 2 and 3 are lateral views of said pallet supply apparatus.

In the following there will be given an outlined explanation of the function of the pallet supply apparatus explained above, with reference to lateral views thereof in FIGS. 2 and 3. As shown in FIG. 2, the main body 2 is provided at a predetermined position with respect to the robot unit 100 and is connected to and controlled by the control unit 200. At first the robot unit 100 executes the pickup operation along the direction of broken line G as explained above. When all the works P contained in the pallet 1 stacked on the first support table 3 are removed, the robot hand 101 moves in a direction J indicated by a white arrow while impinging on a lateral face of the pallet 1, thereby moving said pallet 1 over the pallets 1 stacked on the second support table 4, as indicated by broken lines in FIG. 2. Subsequently the engaging members 6 are moved apart in the directions B, indicated by the black arrow in FIG. 1, and the emptied pallet 1 is thereby stacked on the second support table 4.

The above-explained operation is repeated until all the stacked pallets 1 on the first support table 3 are moved in succession to the second support table 4, except the last one remaining in the work supply position. Subsequently the pallets 1 stacked on the second support table 4, as indicated by broken lines, are taken out in a direction E indicated by a white arrow.

Figure 3:
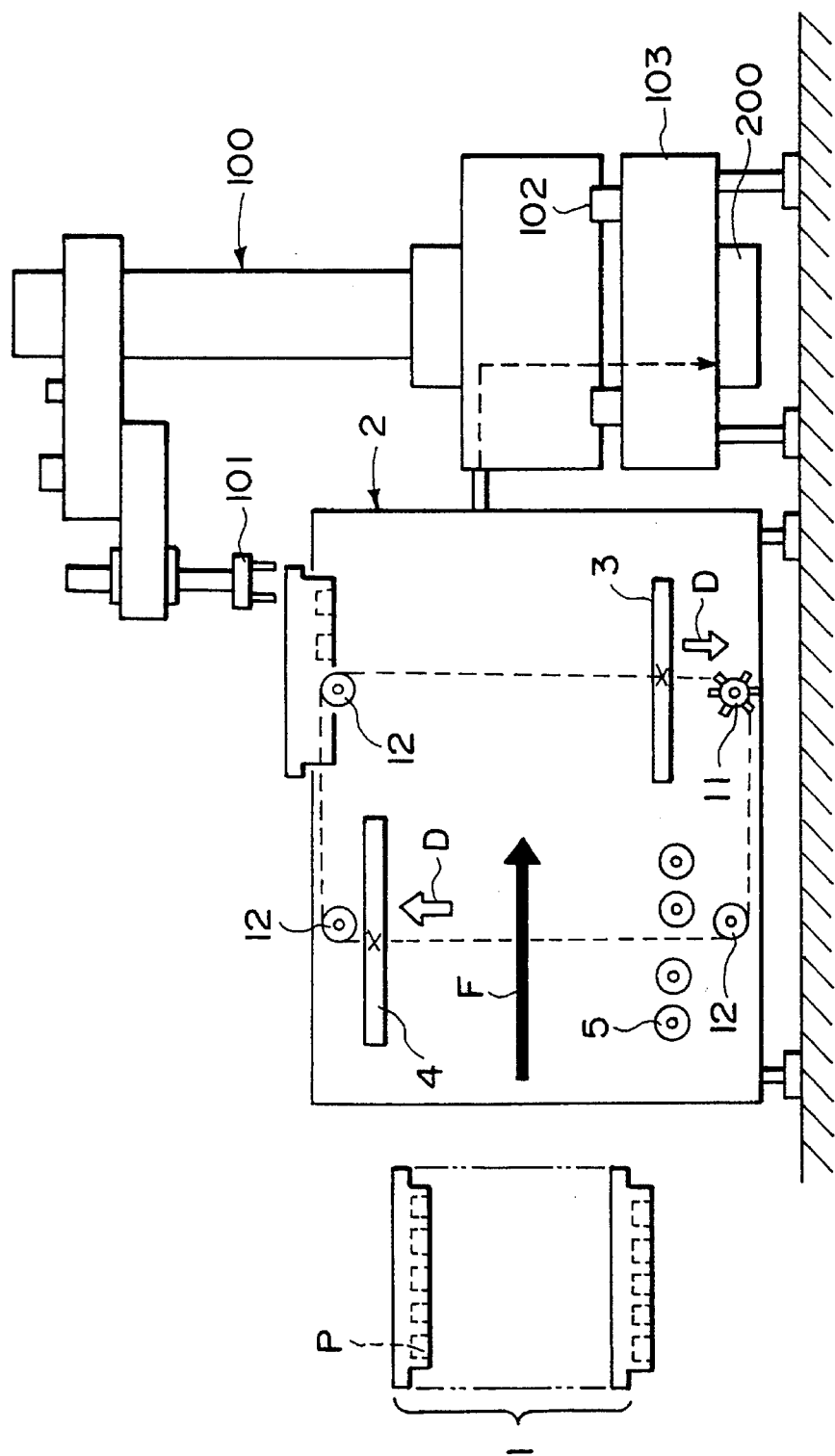
Figure 5:
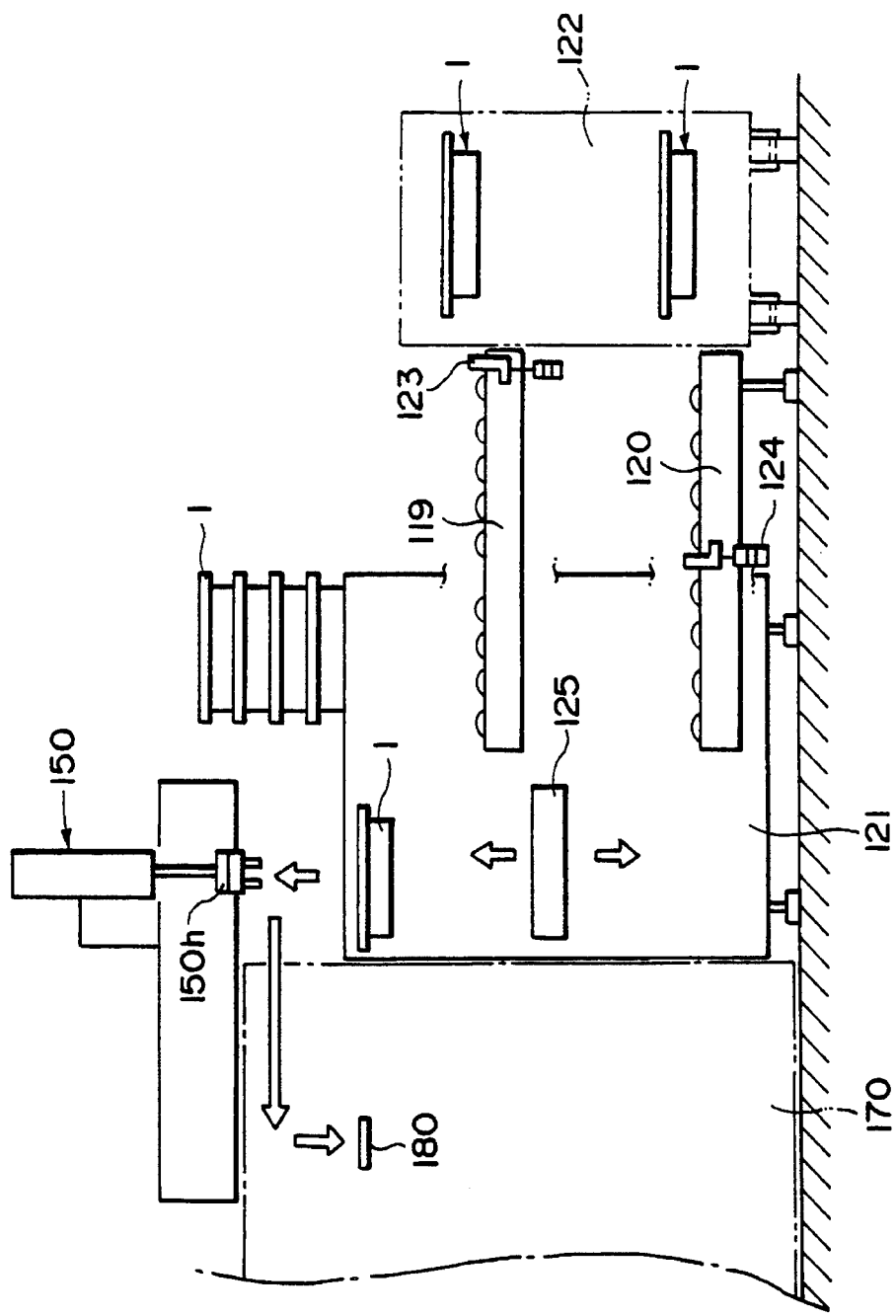
FIG. 5 is a lateral view of a conventional pallet supply apparatus.

Then, as shown in FIG. 3, the second support table 4 is elevated in a direction D indicated by a white arrow to form a space therebelow. Subsequently stacked pallets 1 containing works therein are placed on the conveyor rollers 5 either manually or by a separate inserting mechanism, moved in a direction F indicated by a black arrow, and placed on the first support table 3. The discharge of the empty pallets and the introduction of the pallets containing works mentioned above are conducted while the last one of the previously introduced pallets is still in the work supply position and is subjected to the pickup operation of the robot hand. The foregoing outlines the supply and introduction of the stacked pallets 1.

FIG. 4 is a flow chart of the functions of the pallet supply apparatus, including the function of the engaging members 6 and showing the movement of each pallet 1. Referring to FIGS. 1 and 4, when all the works P are picked up from a pallet. 1 on the first support table 3, a step S1 causes the robot hand 101 to move in the direction J in FIG. 2 in contact with the external wall of the pallet 1, thereby moving said pallet 1 toward the second support table 4. In this operation the protruding edges 1a of the pallet 1 slide on the engaging members 6.

Then a step S2 elevates the second support table 4 to release the protruding edges 1a of the pallet 1 from sliding contact with the engaging member 6. Then a step S3 opens the engaging members 6 in the direction B shown in FIG. 1. Subsequently a step S4 elevates the first support table 3 in the direction C, thereby passing a pallet 1 containing the works P therein between the engaging members 6 in the open state and positioning said pallet 1 above the engaging members 6.

Then a step S5 moves the engaging members 6 towards each other in the directions A to the initial position, where the protruding edges 1a of the pallet 1 can be supported by the engaging members 6. A step S6 lowers the first support table 3, whereby the protruding edges 1a of the pallet 1 are supported by said engaging members 6. Thus the preparation for picking operation for the works P from the pallet 1 is completed by the above-explained steps.

As explained in the foregoing, the pallet supply apparatus of the present invention can be constructed inexpensively, and is capable of preventing eventual collision with the pallet, dispensing with the loading operation of the pallet into the supply apparatus at each pallet supply, and improving the work rate without interruption in the continuous operation of the required equipment.

Also there is provided a pallet supply apparatus allowing easy loading of the pallets onto the first support table.

Also the work supply method of the present invention comprises steps of introducing stacked pallets 1 into a first support table 3 of the supply apparatus 2; elevating pallets on said support table 3 to a work supply position; retaining the uppermost pallet at said work supply position; picking up the works from said pallet by a robot; moving the emptied pallet to a pallet discharge side; and stacking the emptied pallets in succession, wherein the picking operation of the robot can be continued without interruption, by discharging the emptied pallets and introducing new pallets while the last one of the pallets containing works is at the work supply position and is subjected to the picking operation by said robot, whereby the loss in efficiency of the robot in the assembling or working operation can be prevented. Also the present invention allows to simplify the structure of the apparatus, by defining the path for the emptied pallet toward the discharge side by single engaging means (6, 6, 7, 7).

What is claimed is:

1. A work supply method of supplying works for a work supply apparatus, said apparatus comprising:

a robot for effecting an assembling or a working operation on the works;

a first table on which a pallet containing the works is stacked, said first table being movable upward and downward relative to a work supply position;

a second table for stacking an empty pallet, said second table being movable upward and downward;

a first driving means for moving the first and second tables;

engaging means, including a pair of members, which form a single unit in a continuous plane from the work supply position to a pallet discharge position, for engaging with a protruding portion of the pallet and having a track on which a pallet containing the works is maintained at the work supply position and on which an empty pallet is moved by the robot from the work supply position to the pallet discharge position; and a second driving means for driving said engaging means to permit the pair of engaging members to move so as to engage with or disengage from the protruding portion of the pallet, said method comprising the steps of:

(a) moving the engaging members by the second driving means in a direction of disengaging from the protruding portion of the pallet;

(b) moving the first table upward by the first driving means such that the protruding portion of the pallet is located above the engaging members;

(c) moving the engaging members by the second driving means so as to engage with the protruding portion;

(d) moving the first table downward by the first driving means such that a pallet containing the works on the first table is placed on the track of the engaging means;

(e) picking up the works by the robot while holding the pallet containing the works by the engaging means at the work supply position;

(f) transferring, when the pallet at the work supply position has been emptied, the empty pallet to the pallet discharge position on the track by the robot;

(g) moving the engaging members by the second driving means so as to disengage from the protruding portion of the empty pallet to place the empty pallet on the second table; and (h) positioning a next pallet containing the works on the track of the engaging means by effecting steps (a) to (d), with said step (a) for the next pallet containing the works being executed at the same time that said step (g) for the empty pallet is executed.

\* \* \* \* \*

UNITED STATES PATENT AND TRADEMARK OFFICE
CERTIFICATE OF CORRECTION

PATENT NO. : 5,498,122

DATED : March 12, 1996

INVENTORS : TOSHIHIKO MIURA ET AL.

It is certified that error appears in the above-identified patent and that said Letters Patent is hereby corrected as shown below:

IN THE DRAWINGS

Sheet 4 of 5, Figure 4 "UPPER" should read --HIGHER--.

Signed and Sealed this

Thirteenth Day of August, 1996

Attest:

BRUCE LEHMAN

*Attesting Officer*      *Commissioner of Patents and Trademarks*